US008788528B2

(12) United States Patent  (10) Patent No.: US 8,788,528 B2
Ahlander et al.  (45) Date of Patent: Jul. 22, 2014

(54) FILTERING CACHED CONTENT BASED ON EMBEDDED URLS

(75) Inventors: John Lyman Ahlander, Draper, UT (US); Mikko Valimaki, Draper, UT (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1503 days.

(21) Appl. No.: 10/890,893

(22) Filed: Jul. 13, 2004

(65) Prior Publication Data

US 2006/0015472 A1  Jan. 19, 2006

(51) Int. Cl.
*G06F 7/00* (2006.01)
*G06F 17/00* (2006.01)

(52) U.S. Cl.
USPC ............ 707/783; 707/782; 707/781; 709/217

(58) Field of Classification Search
None
See application file for complete search history.

(56) References Cited

U.S. PATENT DOCUMENTS

| | | | |
|---|---|---|---|
| 5,987,606 A | 11/1999 | Cirasole et al. | |
| 5,987,611 A | 11/1999 | Freund | |
| 5,991,810 A * | 11/1999 | Shapiro et al. | ......... 707/999.001 |
| 6,141,694 A | 10/2000 | Gardner | |
| 6,189,030 B1 * | 2/2001 | Kirsch et al. | .................. 709/224 |
| 6,233,618 B1 | 5/2001 | Shannon | |
| 6,336,117 B1 * | 1/2002 | Massarani | ..................... 707/100 |
| 6,357,010 B1 * | 3/2002 | Viets et al. | ..................... 709/225 |
| 6,539,430 B1 * | 3/2003 | Humes | .................. 707/E17.109 |
| 6,606,659 B1 | 8/2003 | Hegli et al. | |
| 2003/0061490 A1 * | 3/2003 | Abajian | ........................ 713/176 |
| 2003/0110161 A1 * | 6/2003 | Schneider | ......................... 707/3 |
| 2003/0204573 A1 * | 10/2003 | Beck et al. | ..................... 709/218 |
| 2004/0044745 A1 * | 3/2004 | Shimizu et al. | ................ 709/217 |
| 2004/0107282 A1 * | 6/2004 | Chakraborty et al. | ........ 709/229 |
| 2005/0160153 A1 * | 7/2005 | Knutson et al. | ............... 709/217 |

OTHER PUBLICATIONS

Fu et al., ("Interchange and interoperability: Toward information retrieval web service for digital libraries" ACM Press, Proceedings of the 4th ACM/IEEE-CS joint conference on Digital libraries JCDL '04, Jun. 2004.*

* cited by examiner

*Primary Examiner* — Fred I Ehichioya
*Assistant Examiner* — Jau-Shya Meng
(74) *Attorney, Agent, or Firm* — Ascenda Law Group, PC

(57) ABSTRACT

The present invention extends to methods, systems, computer program products, and data structures for filtering cached content based on embedded URLs. A computer system accesses a URL that corresponds to cached content. The computer system identifies an embedded URL included in the accessed URL. The embedded URL corresponds to a site that was accessed to retrieve the cached content. The computer system extracts the embedded URL from the accessed URL. The computer system determines whether or not access to the cached content is to be allowed based on the embedded URL.

22 Claims, 4 Drawing Sheets

FILTERING CACHED CONTENT BASED ON EMBEDDED URLS

BACKGROUND OF THE INVENTION

1. The Field of the Invention

The present invention relates to filtering electronic content and, more particularly, to filtering cached content based on embedded URLs

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

More particularly, web browsing has become a common mechanism for accessing electronic content. To access electronic content, a user of a Web browser can enter a Uniform Resource Location ("URL") into a field or select a presented URL link at the Web browser user-interface. Selecting a link can include, for example, selecting a link from a list of favorites or selecting a link from within currently displayed content. In any event, the URL (typically a string of text) is sent to a Domain Name Service ("DNS") and resolved into an electronic address. The Web browser then sends a request for electronic content (e.g., a Web page) to the electronic address. Upon receiving the request, a Web server at the electronic address replies by sending the requested electronic content to (e.g., the electronic address of) the Web browser.

HyperText Transfer Protocol ("HTTP") URLs used to access Web-based content can include a number of different portions. A scheme portion of a URL identifies the URL as corresponding to the HTTP protocol. A host portion of a URL identifies a fully qualified domain name or Internet Protocol ("IP") address of a network host, such as, for example, a computer system (or group of computer systems). A path portion of a URL identifies a path to a specified resource at the network host, such as, for example, to particular content controlled by the computer system identified in the host portion.

Thus, any user that has a URL can request corresponding electronic content from a Web server. On the Internet, this request/reply mechanism is advantageous, since users are provided efficient access to large amounts of diverse electronic content. Users can easily access electronic content on a variety of topics, such as, for example, sports, technology, medicine, etc. However, access to some forms of electronic content, such as, for example, gambling and adult content, may not be appropriate for some users (e.g., children) and/or in some environments (e.g., in the work place).

Accordingly, Web filtering mechanisms have been developed to block electronic content, for example, based on a domain or URL associated with the electronic content. Web filtering mechanisms typically place domains and/or URLs into content categories (e.g., sports, legal, technology, news, etc.). An administrator can then assign user access rights to each content category. For example, the administrator of can configure a Web filtering product (a desktop computer, gateway, caching device, firewall, etc.) to permit or block user access to content categories. Access rights to particular content categories can be based on personal or organizational Internet access policies. For example, an organizational policy can require blocking access to gambling and adult content sites, while allowing access to all other sites.

Search engines are utilized extensively in Web browsing to automatically and quickly identify links to relevant content. At times, a search engine may be the only efficient mechanism for finding content related to a particular subject. As a result, filtering products often group search engines in a specific search engine category and typically do not block the search engine category. Thus, users are typically permitted to utilize search engines to search for content.

Search engine results typically include a list of accessible links (representing URLs) to relevant content. To access the relevant content, a user accesses a presented link and the corresponding content is returned. However, accessing a presented link causes filtering mechanisms to check the content category of the domain and/or URL of the link. If access to content in the content category is not permitted, the returning content is blocked. Thus, even if a user performs a search for blocked content and is returned a link, the user is typically prevented from actually accessing the blocked content.

Search engines can maintain cached versions of other Web sites to provide access to older copies of the other Web sites, for example, when the other Web sites are not available or off-line when a search is performed. Thus, the results of a Web search can include links to cached Web pages as well as current Web pages. Accordingly, by maintaining cached content, search engines can provide search results that include links to at least some relevant content, even if the relevant content is not the most recent content.

In some environments, search engines provide search engine functionality and access to cached content at a URL having the same host portion. That is, the host portion of the URL identifies a computer system (or group of computer systems) providing search engine functionality and providing access to cached content. For example, a search engine server and storage server may be identified by the same host portion.

Unfortunately, since filtering mechanisms typically prevent access to content based on domain or URL and since cached content is sent from a URL corresponding to the search engine, it is possible to circumvent filtering mechanisms by accessing cached content. That is, aside from the URL used to access the cached content, there is essentially no way for filtering mechanisms to determine what content is being access. Thus, when a search engine caches potentially undesirable content and then provides access to the potentially undesirable content at a search engine URL, it may be difficult, if not impossible, to block the undesirable content without also preventing access to the search engine functionality.

In other environments, search engines provide search engine functionality at a first URL having a first host portion and provide access to cached content at a second URL having a second different host portion. That is, the first URL identifies a first computer system (or first group of computer systems) providing search engine functionality and the second URL identifies a second different computer system (or second different group of computer systems) providing access to cached content. For example, a first URL with a first host portion can identify a search engine server and a second URL with a second different host portion can identify a storage server.

In these other environments, it may be possible to block access to undesirable cached content, while still providing access to search engine functionality. That is, a filtering mechanism can allow access to content at a URL providing search engine functionality and deny access to content at a URL providing access to cached content. Unfortunately, preventing access to content at a URL providing access to cached content prevents access to all content at the URL, including content that is not otherwise blocked by filtering mechanisms. For example, blocking all cached content from a URL can cause cached news content to be blocked even when the news content category is not blocked.

Accordingly, administrators are often forced to allow access to undesirable cached content (to allow access to search engine functionality or other desirable cached content), even when filtering mechanisms are configured to otherwise block similar non-cached content. Therefore systems, methods, and computer program products that facilitate more intelligent filtering of electronic content would be advantageous.

BRIEF SUMMARY OF THE INVENTION

The foregoing problems with the prior state of the art are overcome by the principles of the present invention, which are directed towards methods, systems, and computer program products for filtering cached content based on embedded URLs. A computer system accesses a URL that corresponds to cached content. The computer system identifies an embedded URL included in the accessed URL. The embedded URL corresponds to a site that was accessed to retrieve the cached content. The computer system extracts the embedded URL from the accessed URL. The computer system determines if access to the cached content is to be allowed based on the embedded URL.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for filtering cached content based on embedded URLs. A computer system accesses a URL that corresponds to cached content. The computer system identifies an embedded URL included in the accessed URL. The embedded URL corresponds to a site that was accessed to retrieve the cached content. The computer system extracts the embedded URL from the accessed URL. The computer system determines if access to the cached content is to be allowed based on the embedded URL.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system to cause the general-purpose computer system or special-purpose computer system to perform a certain function or group of functions. Computer-executable instructions include, for example, binaries, intermediate format instructions such as assembly language, interpretable code, or even source code.

As used herein, the term "module" or "component" refers to software objects or routines that execute on the computing system. Computer-executable instructions can be included in different components, modules, engines, and services described herein and may be implemented as objects or processes that execute on the computing system (e.g., as separate threads). While the system and methods described herein are preferably implemented in software, implementations in software and hardware or hardware are also possible and contemplated.

Figure 1:
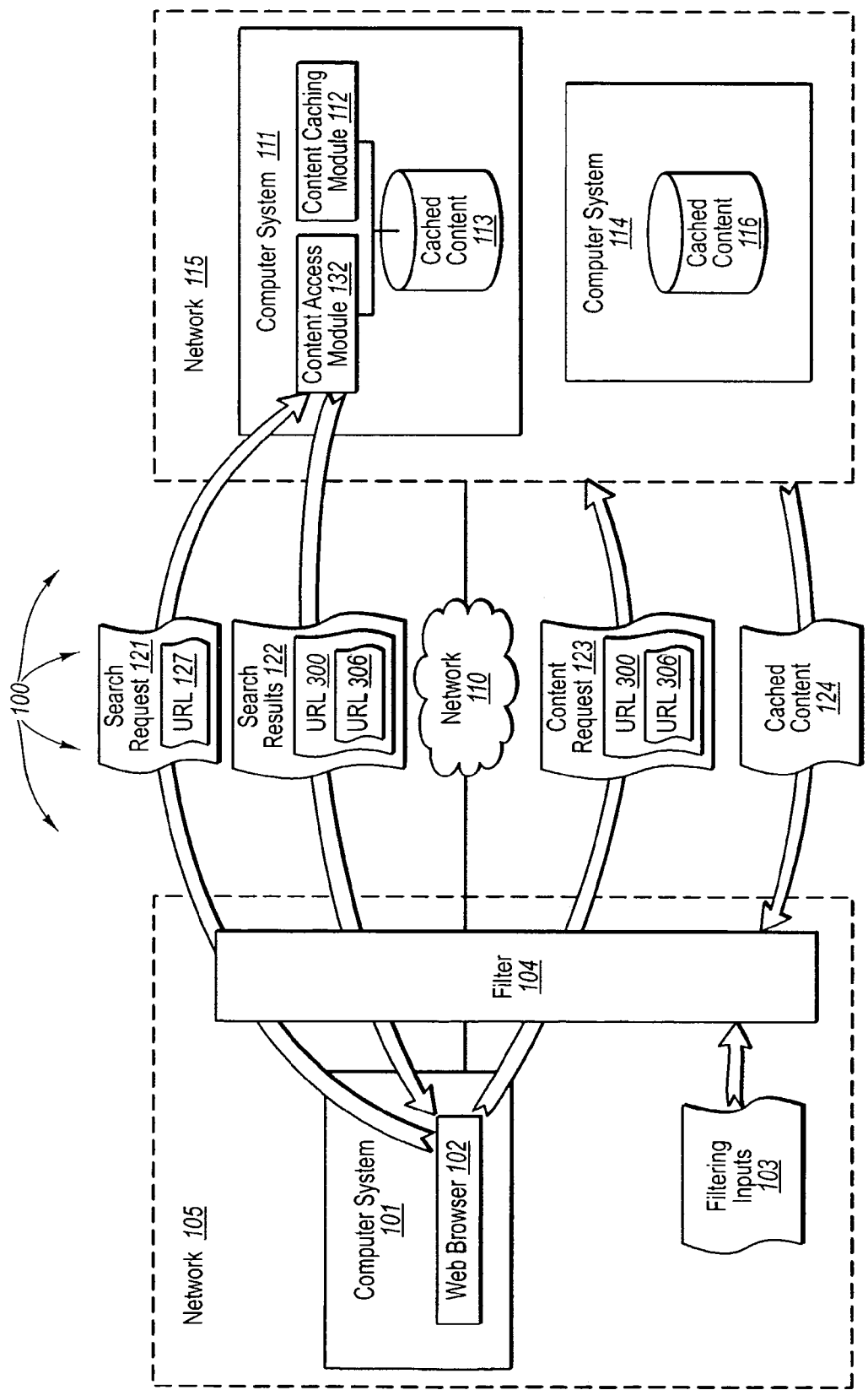
FIG. 1 illustrates an example of a computer architecture that facilitates filtering cached content based on embedded URLs.

FIG. 1 illustrates an example of a computer architecture 100 that facilitates filtering cached content based on embedded URLs. As depicted, network 110 can be a Local Area Network ("LAN"), Wide Area Network ("WAN"), or even the Internet. Computer systems connected to network 110 can exchange content, such as, for example, electronic mail and Web pages, using various protocols, such as, for example, Internet Protocol ("IP"), Transmission Control Protocol ("TCP"), and HyperText Transfer Protocol ("HTTP").

URLs used to access content can include a plurality of different portions. Generally, a URL includes the name of a scheme that is to be used (e.g., "http", "ftp", "telnet", etc.), followed by a colon ":", and then a string whose interpretation depends on the scheme (i.e., a scheme-specific-part). The HTTP URL scheme is used to identify resources accessible using HTTP. A HTTP URL can be of the form:

http://<host>:<port>/<path>?<searchpart>

The host portion of a HTTP URL identifies a fully qualified domain name or IP address of a network host, such as, for example, a computer system (or group of computer systems). The port portion of a HTTP URL indicates a port number (e.g., 80) of the network host identified in the host portion that is to be connected to. The default port for HTTP communication is 80. The port portion of an HTTP URL may be omitted, in which case the port defaults to 80. The path portion of a HTTP URL is an HTTP selector, such as, for example, the path to a resource of the network host. The searchpart portion of an HTTP URL is a query string. Both the path and searchpart portions of an HTTP URL are optional.

As used herein, the term "cached content" refers to content (e.g., a Web page) that was accessed from an original site (e.g., using an original URL corresponding to the original site) and stored (or cached) at a caching site. Thus, the content can be accessed using a URL corresponding to the caching site (e.g., by embedding the original URL in the URL corresponding to the caching site), even if the original site is inaccessible. Cached content can include, for example, search engine cached content, language translated cached content, and archive site cached content.

Computer architecture 100 includes network 105 and network 115. Network 105 can be, for example, a Local Area Network ("LAN") or Home Area Network ("HAN"), having one or more computer systems that exchange content with other computer systems connected to network 110. Web browser 102 can request, receive, and present electronic content, such as, for example, Web pages. Requesting content can include sending an HTTP GET to a URL corresponding to the content. Receiving content can include receiving HTTP message bodies that contain content. Web browser 102 can open an appropriate TCP socket between computer system 101 and a network host before initiating HTTP communication.

Filter 104 (e.g., an HTTP proxy) filters electronic content received at network 105 based on filtering inputs 103. Filtering inputs 103 can include filtering rules that are to be applied to electronic content when electronic content is received at network 103. Filter 104 can allow or deny access to electronic content received at network 105 in accordance with filtering inputs 103. Filtering inputs 103 may include one or more content categories that group different Web site domains and/or URLs based on the content provided by the Web sites. Access rights to particular content categories can be based on personal or organizational (e.g., Internet) access policies.

From time to time, filtering inputs 103 can be updated. For example, an administrator of network 105 may manually configure filtering inputs 103 based on changes to network 110. Alternately, the administrator or an automated mechanism in network 105 may download updated filtering inputs (e.g., from a service provider) for inclusion in filtering inputs 103. In some embodiments, filtering inputs 103 are updated in essentially real-time when content from a previously unrated URL is received. For example, filtering inputs 103 may interface with a Dynamic Real-Time Rating ("DRTR") system that determines the appropriate content category for a URL. The DRTR system can determine a content category for a URL when the URL is initially received or when such a determination is otherwise appropriate (e.g., to re-categorize a URL).

Although filter 104 is depicted as a separate module, it may be that filter 104 is included in computer system 101. In alternate environments, it may be that filter 104 is external to computer system 101 and that computer system 101 also includes another filter. In such an alternate environment, a filter included in computer system 101 can further restrict content that is accessible at computer system 101.

Network 115 can include one or more computer systems relating to searching for and providing content, such as, for example, Web pages. As depicted, computer system 11 includes content access module 132 and caching module 112 (e.g., modules of a search engine, archive site, or language translation site) and cached content 113. Computer system 114 includes cached content 116. Cashed content 113 and cached content 116 can be content retrieved from Web sites and stored for subsequent presentation to requesting Web browsers. For example, content caching module can, from time to time, access Web sites and can copy the content of the Web sites to cached content 113.

Content access module 132 and cached content 113 may be accessible at URLs with the same host portion, for example, a host portion (a domain name or IP address) that corresponds to computer system 111. On the other hand, content access module 132 and cached content 116 may be accessible at URLs with at least different host portions. For example, cached content 116 may be accessible at a URL having a host portion that corresponds to computer system 114 (while content access module 132 is accessible at a URL having a host portion that corresponds to computer system 111).

Content access module 132 can, for example, receive and process search requests (e.g., HHTP GET commands including a searchpart portion), receive and process requests for archived content, and/or receive and process requests for content that is to be language translated. At least for search requests, based on character matching or other searching mechanisms, content access module 132 can return links (e.g., in HTTP message bodies) to content that satisfies received search criteria. When appropriate (e.g., a search engine can not contact a Web site), the search engine can return links to content included in cached content 113 and/or cached content 116.

Figure 3:
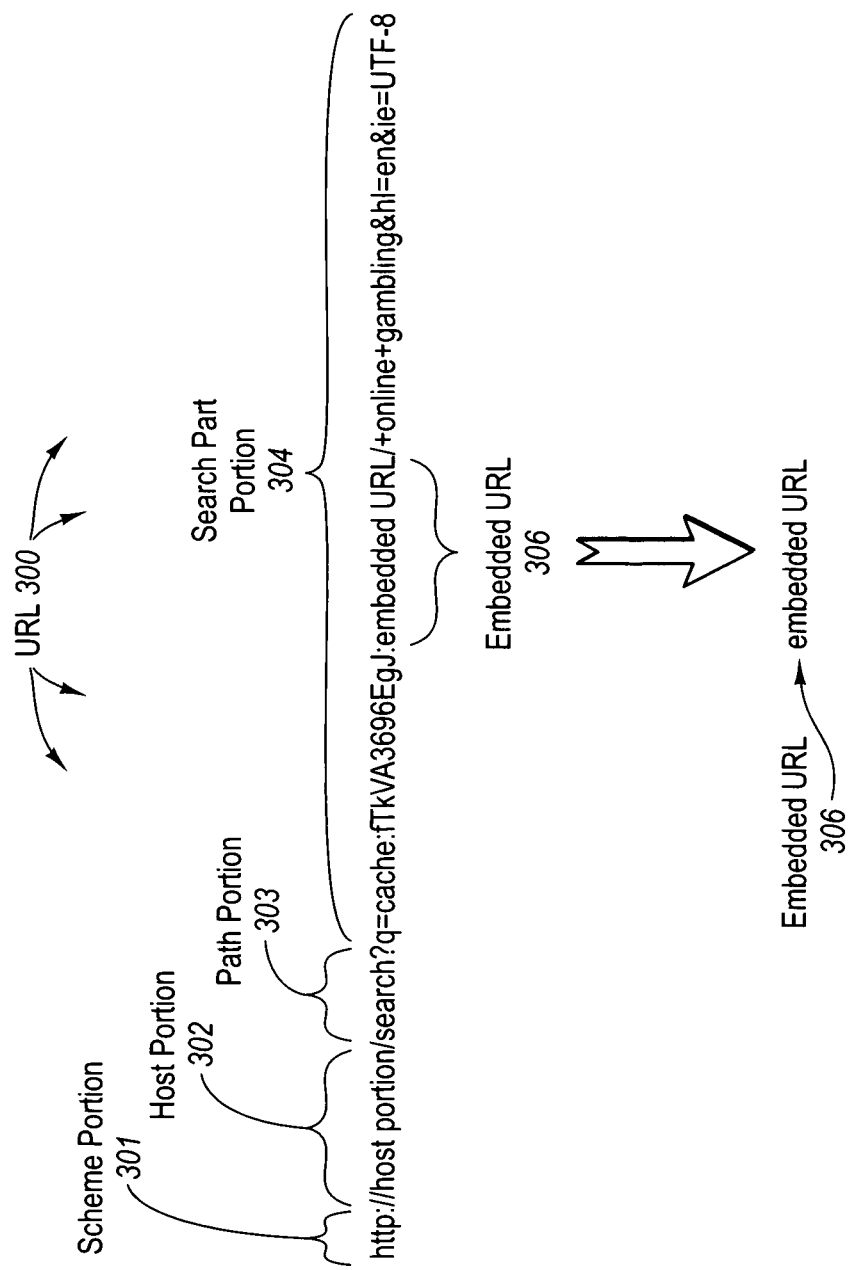
FIG. 3 illustrates an example of a URL that contains an embedded URL.

Links to cached content can include URLs having a path or search part portion with an embedded URL. The embedded URL can correspond to a Web site that was accessed to retrieve the cached content. For example, referring now to FIG. 3, URL 300 includes scheme portion 301, host portion 302, path portion 303, and searchpart portion 304. Embedded URL 306 is embedded in searchpart portion 304. Content access module 132 can return URL 300 (along with one or more other URLs) in response to a search request from Web browser 102. Embedded URL 306 can include at least a host portion of a URL for a Web site that was accessed to retrieve cached content. For example, embedded URL 306 can refer to a Web site that was accessed to retrieve cached content stored in cached content 113 or cached content 116.

Figure 2:
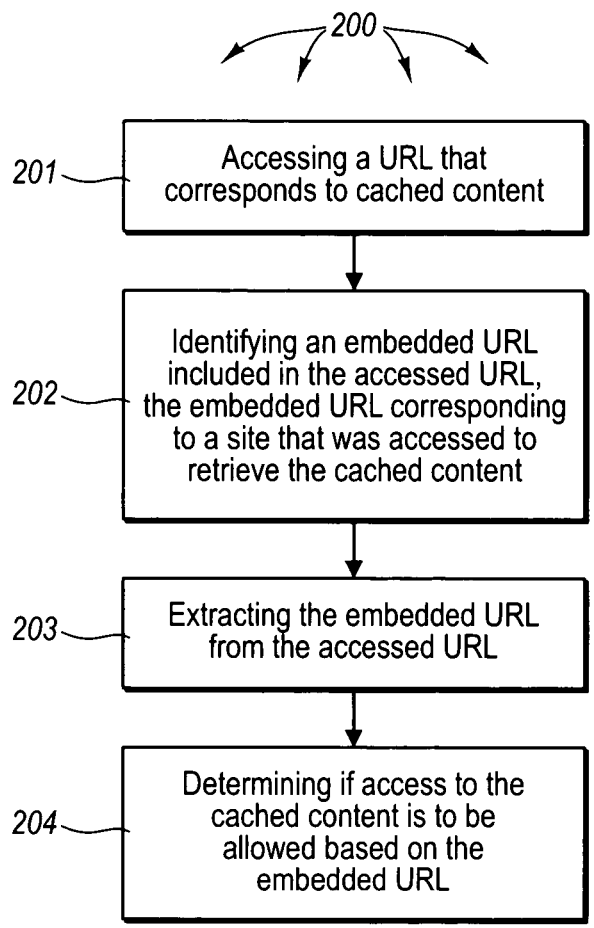
FIG. 2 illustrates an example flowchart of a method for filtering cached content based on embedded URLs

FIG. 2 illustrates an example flowchart of a method 200 for filtering cached content based on embedded URLs. The method 200 will be described with respect to the components and a data in FIG. 1 and the URLs in FIG. 3. Although description of method 200 is at least in part directed to filtering search engine cached content, other methods similar to method 200 can be utilized to filter archive site cached content and language translated cached content.

The method 200 includes an act of accessing a URL that corresponds to cached content (act 201). For example, Web browser 102 can send search request 121 to URL 127. URL 127 can include a host portion corresponding to computer system 111, a path portion corresponding to content access module 132 (e.g., a search engine), and a searchpart portion including search criteria. In response to search request 121, content access request 132 can return search results 122 indicating content that satisfies the search criteria. Search results 122 can include one or more URLs, such as, for example, URL 300, that are received at filter 104.

Filter 104 can detect that search results 122 includes content from a Web site in a search engine category (or archive site or language translation site), for example, based on URL 127, and can allow search results 122 to be transferred to Web browser 102. Web browser 102 can present the search results, including a list of links to content that satisfies search criteria, to a user at computer system 101. The user can select a link to request content from a corresponding Web site. Selecting a link can include selecting a link to cached content at cached content 113 or 116. For example, a user can select a link corresponding to URL 300 to cause content request 123 (e.g., an HTTP GET) to be sent to network 115.

The method 200 includes an act of identifying an embedded URL included in the accessed URL (act 202). The embedded URL corresponds to a site that was accessed to retrieve the cached content. For example, filter 104 can identify embedded URL 306 from URL 300. Filter 104 can parse a path portion and/or a searchpart portion of an accessed URL to attempt to identify embedded URLs (e.g., attempting to identify text that resembles a URL, such as, three consecutive "w" characters). For example, filter 104 can parse path portion 303 and searchpart portion 304 when attempting to identify embedded URL 306. Filter 104 can be configured to identify embedded URL 306 from search results 122 and/or content request 123.

The method 200 includes an act of extracting the embedded URL from the accessed URL (act 203). For example, filter 104 can extract embedded URL 306 from URL 300.

The method 200 includes an act of determining if access to the cached content is to be allowed based on the embedded URL (act 204). In response to receiving content request 123, network 115 can return cached content 124 (e.g., in one or more HTTP message bodies) from cached content 113 or 116. Based on embedded URL 306, filter 104 can determine if access to cached content 124 is to be allowed. When access to cached content 124 is to be allowed, filter 104 can transfer cached content 124 to Web browser 102. On the other hand, when access to cached content 124 is to be denied, filter 104 does not transfer cached content 124 to Web browser 102.

Alternately, when filter 104 is configured to parse and extract embedded URLs from search results (e.g., from within URL 300), filter 104 may prevent content request 123 from being sent to network 115. That is, since Web browser 102 is prevented from accessing any returned content (e.g., cached content 124), filter 104 may simply terminate content request 123 such that content request 123 is not transferred across network 110. Filter 104 can return an appropriate message to Web browser 102 indicating that content request 123 was terminated.

Parsing for and extracting embedded URLs from accessed URLs increases the likelihood of identifying the correct content category for cached content. Correct identification of a content category for cached content in turn facilitates appropriate filtering and application of access rights corresponding to the cached content. Accordingly, embodiments of the present invention reduce the likelihood of a search engine, archive site, or language translator site (or other Web site from an allowed content category that caches content) being used to circumvent access rights to particular content categories.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Figure 4:
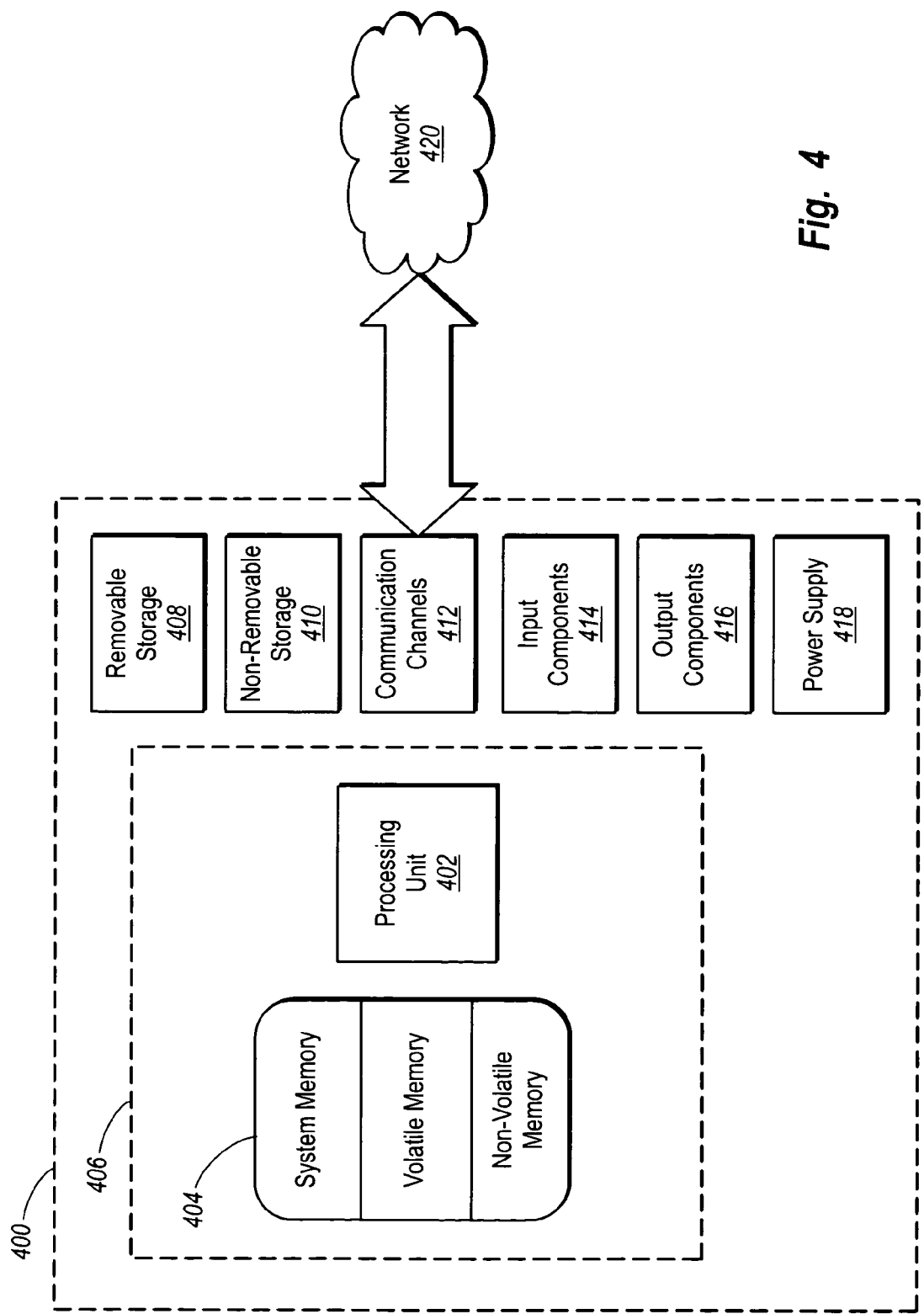
FIG. 4 illustrates a suitable operating environment for the principles of the present invention.

FIG. 4 illustrates a computing system 400. For descriptive purposes, the architecture portrayed is only one example of a suitable environment and is not intended to suggest any limitation as to the scope of use or functionality of the invention. Neither should the computing systems be interpreted as having any dependency or requirement relating to any one or any combination of components illustrated in FIG. 4.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, firewalls, gateways, proxies, caching devices, and distributed computing environments that include any of the above systems or devices.

In its most basic configuration, a computing system 400 typically includes at least one processing unit 402 and memory 404. The memory 404 may be volatile (such as RAM), non-volatile (such as ROM, flash memory, etc.), or some combination of the two. This most basic configuration is illustrated in FIG. 4 by the dashed line 406.

The storage media devices may have additional features and functionality. For example, they may include additional storage (removable and non-removable) including, but not limited to, PCMCIA cards, magnetic and optical disks, and magnetic tape. Such additional storage is illustrated in FIG. 4 by removable storage 408 and non-removable storage 410. Computer-storage media include volatile and non-volatile, removable and non-removable media implemented in any method or technology for storage of information such as computer-readable instructions, data structures, program modules, or other data. Memory 404, removable storage 408, and non-removable storage 410 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

For example, computing system 400 can also contain communication channels 412 that allow the host to communicate with other systems and devices, for example, via network 420. In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media.

Communication channels 412 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 400 may also have input components 414 such as a keyboard, mouse, pen, a voice-input component, a touch-input device, and so forth. Output components 416 include screen displays, speakers, printer, etc., and rendering modules (often called "adapters") for driving them. The computing system 400 has a power supply 418. All these components are well known in the art and need not be discussed at length here.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, Web browsers, filters, and search engines, as well as associated data, including filtering inputs, cached content, search requests, search results, content requests, and URLs can be stored and accessed from any of the computer-readable media associated with computer system 400. For example, portions of such modules and portions of associated program data may be included in an operating system, application program, program module, and/or program data, for storage in system memory 404.

When a mass storage device, such as, for example, non-removable storage 410, is coupled to computing system 400, such modules and associated program data may also be stored in the mass storage device. In a networked environment, program modules depicted relative to computing system 400, or portions thereof, can be stored in remote memory storage devices, such as, system memory and/or mass storage devices associated with remote computer systems. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method, comprising:
    receiving, at a filtering computer system, a request to access cached content corresponding to a first Hypertext Transfer Protocol (HTTP) Universal Resource Locator (URL), wherein the first HTTP URL comprises a string that resolves into a location where the cached content is cached, and wherein the first HTTP URL includes a first host portion corresponding to a caching site;
    identifying, at the filtering computer system, an embedded HTTP URL within the string of the first HTTP URL, wherein the embedded HTTP URL includes a second host portion, and wherein the second host portion corresponds to a site that was accessed by a content caching module to retrieve the cached content;
    extracting, at the filtering computer system, the embedded HTTP URL from the first HTTP URL, wherein the embedded HTTP URL extracted from the first HTTP URL includes the second host portion;
    determining, at the filtering computer system, whether or not access to the cached content corresponding to the first HTTP URL is permitted based on the embedded HTTP URL extracted from the first HTTP URL; and
    if access to the cached content corresponding to the first HTTP URL is permitted, permitting access to the cached content, otherwise, not permitting access to the cached content,
    wherein the embedded HTTP URL is embedded in one of a path portion and searchpart portion of the first HTTP URL, and wherein identifying the embedded HTTP URL comprises parsing one or more of the path portion and searchpart portion of the first HTTP URL to identify text resembling the embedded HTTP URL.

2. The method as recited in claim 1, wherein the first host portion corresponds to a Web site that is not blocked by content filtering rules.

3. The method as recited in claim 1, wherein the first HTTP URL corresponds to a search engine, archive site, or language translation site.

4. The method as recited in claim 1, wherein the first HTTP URL is accessed from an HTTP message body.

5. The method as recited in claim 1, wherein the first HTTP URL corresponds to search engine cached content.

6. The method as recited in claim 1, wherein the first HTTP URL corresponds to archive site cached content.

7. The method as recited in claim 1, wherein the first HTTP URL corresponds to language translated cached content.

8. The method as recited in claim 1, wherein identifying the embedded HTTP URL comprises identifying the second host portion corresponding to a Web site that is blocked by content filtering rules.

9. The method as recited in claim 1, wherein determining whether or not access to the cached content corresponding to the first HTTP URL is permitted comprises determining access rights to the cached content based on filtering inputs.

10. The method as recited in claim 1, wherein access to the cached content is blocked, even though access to a Web site corresponding to the first host portion of the first HTTP URL is permitted.

11. The method as recited in claim 1, further comprising:
    prior to accessing the cached content corresponding to the first HTTP URL, sending a search request to a search engine; and
    receiving search results that include the first HTTP URL.

12. The method as recited in claim 1, further comprising requesting the cached content.

13. The method as recited in claim 12, wherein requesting the cached content comprises sending an HTTP GET to the first HTTP URL.

14. The method as recited in claim 12, wherein requesting the cached content comprises requesting content from the first HTTP URL having the first host portion that is the same as a third host portion of a second HTTP URL for a search engine that previously returned search results.

15. The method as recited in claim 12, wherein requesting the cached content comprises requesting content from the first HTTP URL having the first host portion that differs from a third host portion of a second HTTP URL for a search engine that previously returned search results.

16. A non-transitory storage medium having stored thereon executable instructions that when executed by a processor of a content filter computer system, cause a content filter to:
- receive, at the content filter computer system, a request to access cached content corresponding to a first Hypertext Transfer Protocol (HTTP) Universal Resource Locator (URL), wherein the first HTTP URL comprises a string that resolves into a location where the cached content is cached, and wherein the first HTTP URL includes a first host portion corresponding to a caching site;
- identify, at the content filter computer system, an embedded HTTP URL within the string of the first HTTP URL, wherein the embedded HTTP URL includes a second host portion, and wherein the second host portion corresponds to a site that was accessed by a content caching module to retrieve the cached content;
- extract, at the content filter computer system, the embedded HTTP URL from the first HTTP URL, wherein the embedded HTTP URL extracted from the first HTTP URL includes the second host portion;
- determine, at the content filter computer system, whether or not access to the cached content corresponding to the first HTTP URL is permitted based on the embedded HTTP URL extracted from the first HTTP URL; and
- if access to the cached content corresponding to the first HTTP URL is permitted, permit access to the cached content, otherwise, not permit access to the cached content,
- wherein the embedded HTTP URL is embedded in one of a path portion and searchpart portion of the first HTTP URL, and wherein identifying the embedded HTTP URL comprises parsing one or more of the path portion and searchpart portion of the first HTTP URL to identify text resembling the embedded HTTP URL.

17. The non-transitory storage medium as recited in claim 16, wherein the executable instructions include instructions that, when executed by the processor, cause the content filter to identify the second host portion corresponding to a Web site that is blocked by content filtering rules.

18. The non-transitory storage medium as recited in claim 16, wherein the executable instructions include instructions that, when executed by the processor, cause the content filter to determine that access to the cached content corresponding to the first HTTP URL is to be blocked, even though access to a Web site corresponding to the first host portion of the first HTTP URL is permitted.

19. A computer system for filtering electronic content based on an embedded URL, the computer system comprising one or more processing units and memory, the memory containing instructions that when executed by the one or more processing units, cause a content filter to:
- receive a request from one of the processing units to access cached content corresponding to a first a Hypertext Transfer Protocol (HTTP) Universal Resource Locator (URL), wherein the first HTTP URL comprises a string that resolves into a location where the cached content is cached, and wherein the first HTTP URL includes a first host portion corresponding to a caching site;
- identify an embedded HTTP URL within the string of the first HTTP URL, wherein the embedded HTTP URL includes a second host portion, and wherein the second host portion corresponds to a site that was accessed by a content caching module to retrieve the cached content;
- extract the embedded HTTP URL from the first HTTP URL, wherein the embedded HTTP URL extracted from the first HTTP URL includes the second host portion;
- determine whether or not access to the cached content corresponding to the first HTTP URL is permitted based on the embedded HTTP URL extracted from the first HTTP URL; and
- if access to the cached content corresponding to the first HTTP URL is permitted, permit access to the cached content, otherwise, not permit access to the cached content,
- wherein the embedded HTTP URL is embedded in one of a path portion and searchpart portion of the first HTTP URL, and wherein identifying the embedded HTTP URL comprises parsing one or more of the path portion and searchpart portion of the first HTTP URL to identify text resembling the embedded HTTP URL.

20. The computer system as recited in claim 19, wherein the first HTTP URL comprises one of: a search engine URL, an archive site URL, or a language translation site URL.

21. The computer system as recited in claim 19, wherein the content filter is further configured to identify the second host portion corresponding to a Web site that is blocked by the content filter.

22. The computer system as recited in claim 19, wherein the content filter is further configured to determine that access to the cached content is to be blocked, even though access to a Web site corresponding to the first host portion of the first HTTP URL is permitted.

* * * * *